United States Patent
Yamauchi

(10) Patent No.: US 10,286,576 B2
(45) Date of Patent: May 14, 2019

(54) COUPLING STRUCTURE FOR RESIN PARTS, AND METHOD OF MANUFACTURING SAME

(71) Applicant: HONDA MOTOR CO., LTD., Minato-ku, Tokyo (JP)

(72) Inventor: Yohei Yamauchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 802 days.

(21) Appl. No.: 14/462,732

(22) Filed: Aug. 19, 2014

(65) Prior Publication Data

US 2015/0078817 A1    Mar. 19, 2015

(30) Foreign Application Priority Data

Aug. 27, 2013  (JP) .................... 2013-175281

(51) Int. Cl.
*F16B 2/22*   (2006.01)
*B29C 33/34*  (2006.01)
(Continued)

(52) U.S. Cl.
CPC .............. *B29C 33/34* (2013.01); *B29C 33/44* (2013.01); *B29C 45/44* (2013.01); *B62J 17/00* (2013.01);
(Continued)

(58) Field of Classification Search
CPC .......... B29L 2031/7278; B29L 2031/30; F16B 5/0258; F16B 5/0657; F16B 5/0664;
(Continued)

(56) References Cited

U.S. PATENT DOCUMENTS 4,232,356 A * 11/1980 Saunders ............. H05K 7/1425
174/DIG. 9
4,672,732 A *  6/1987 Ramspacher ............. F16B 5/02
29/429

(Continued)

FOREIGN PATENT DOCUMENTS

DE   102007014984 A1 * 10/2007 ......... B60R 13/0838
JP   2012-061925 A    3/2012
(Continued)

*Primary Examiner* — Matthew R McMahon
(74) *Attorney, Agent, or Firm* — Carrier Blackman & Associates, P.C.; Joseph P. Carrier; Anne G. Sabourin

(57) ABSTRACT

A resin parts coupling structure includes first and second resin members, e.g., parts of a motorcycle body. The first member includes a first projected portion projected inwardly from a flat surface portion of the vehicle body. The second member includes a second projected portion engaged with and thereby coupled to the first projected portion. The first projected portion includes a hollow space formed between an inside surface of the first projected portion and the flat surface portion, an engagement hole communicating between the hollow space and the flat surface portion, and a first receiving portion disposed away from the engagement hole. The second projected portion includes a second receiving portion which contacts the first receiving portion, and a claw portion which extends outwardly of the second receiving portion and securely engages the engagement hole.

17 Claims, 7 Drawing Sheets

(51) Int. Cl.
    *B29C 45/44*     (2006.01)
    *B29C 33/44*     (2006.01)
    *B62J 17/00*     (2006.01)
    *B29L 31/30*     (2006.01)
    *B29L 31/00*     (2006.01)
    *B29C 45/00*     (2006.01)

(52) U.S. Cl.
    CPC ... *B29C 2045/0093* (2013.01); *B29L 2031/30* (2013.01); *B29L 2031/7278* (2013.01); *Y10T 403/70* (2015.01); *Y10T 403/7045* (2015.01)

(58) Field of Classification Search
    CPC .............. F16B 5/065; B29C 2045/0093; B60R 13/0206; B62J 17/02; Y10T 403/7045
    See application file for complete search history.

(56) References Cited

U.S. PATENT DOCUMENTS

| | | | | |
|---|---|---|---|---|
| 5,699,601 | A * | 12/1997 | Gilliam | B25B 27/00 29/270 |
| 6,074,150 | A * | 6/2000 | Shinozaki | B60R 13/0206 24/297 |
| 6,276,109 | B1 * | 8/2001 | Hingorani | B60R 13/04 52/716.1 |
| 6,668,424 | B1 * | 12/2003 | Allen | B60N 3/026 16/436 |
| 7,165,371 | B2 * | 1/2007 | Yoyasu | B60R 13/04 24/292 |
| 7,231,696 | B2 * | 6/2007 | Asano | B60R 13/0206 24/297 |
| 7,354,102 | B2 * | 4/2008 | Cave | B60R 13/0206 296/1.08 |
| 7,428,122 | B2 * | 9/2008 | Kimura | G11B 25/043 277/650 |
| 7,431,374 | B2 * | 10/2008 | Konno | B62J 17/02 296/198 |
| 7,438,340 | B2 * | 10/2008 | Kurihara | B62J 17/06 296/37.1 |
| 7,712,992 | B2 * | 5/2010 | Hirose | F16B 5/025 403/168 |
| 7,753,423 | B2 * | 7/2010 | Zellner, Jr. | B60R 13/0206 248/27.3 |
| 8,267,460 | B2 * | 9/2012 | Kurihara | B62J 17/02 180/219 |
| 8,591,792 | B2 * | 11/2013 | Mizuno | B29C 45/036 264/267 |
| 8,628,136 | B2 | 1/2014 | Yasuhara et al. | |
| 8,671,528 | B2 * | 3/2014 | Hayashi | F16B 5/065 24/297 |
| 8,845,228 | B2 * | 9/2014 | Ikekame | B29C 65/607 403/167 |
| 8,877,113 | B2 * | 11/2014 | Ishizu | B29C 45/14336 264/238 |
| 8,899,653 | B2 * | 12/2014 | Usa | B62J 17/02 296/78.1 |
| 9,097,270 | B2 * | 8/2015 | Fitz Roman | F16B 2/22 |
| 9,103,361 | B2 * | 8/2015 | Tanabe | F16B 2/20 |
| 9,415,821 | B2 * | 8/2016 | Oishi | B62J 9/003 |
| 9,463,831 | B2 * | 10/2016 | Morris | B62D 27/04 |
| 9,534,620 | B2 * | 1/2017 | Courtin | F16B 5/065 |
| 2008/0038053 | A1 * | 2/2008 | Lai | F16B 5/0258 403/371 |
| 2009/0110507 | A1 * | 4/2009 | Katoh | B60R 13/0206 411/80.1 |
| 2012/0257924 | A1 * | 10/2012 | Andrews | F16B 5/0657 403/381 |
| 2014/0317889 | A1 * | 10/2014 | Hida | B60R 13/04 24/293 |
| 2015/0093177 | A1 * | 4/2015 | Morris | F16B 5/065 403/13 |

FOREIGN PATENT DOCUMENTS

| | | | | |
|---|---|---|---|---|
| WO | WO 2006010488 A1 * | 2/2006 | ............ | F16B 5/065 |
| WO | WO-2013088447 A1 * | 6/2013 | ........ | B29C 45/4407 |

* cited by examiner

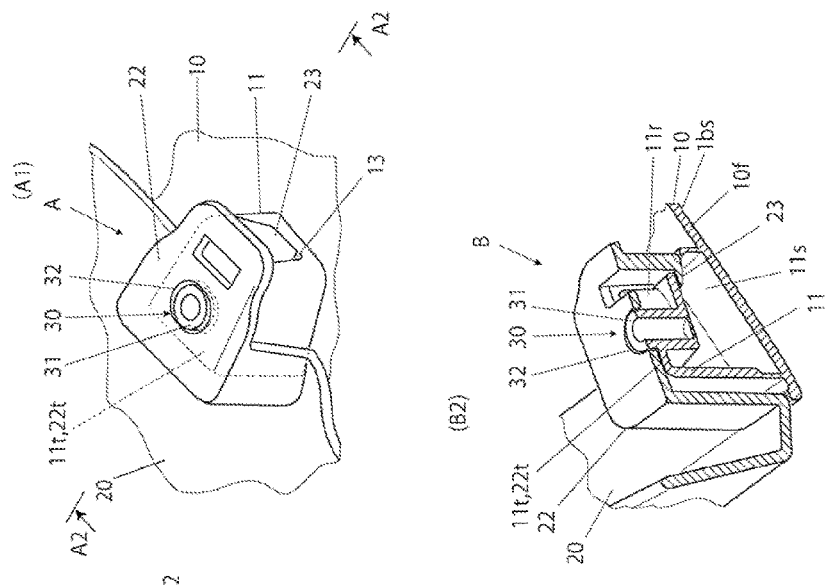
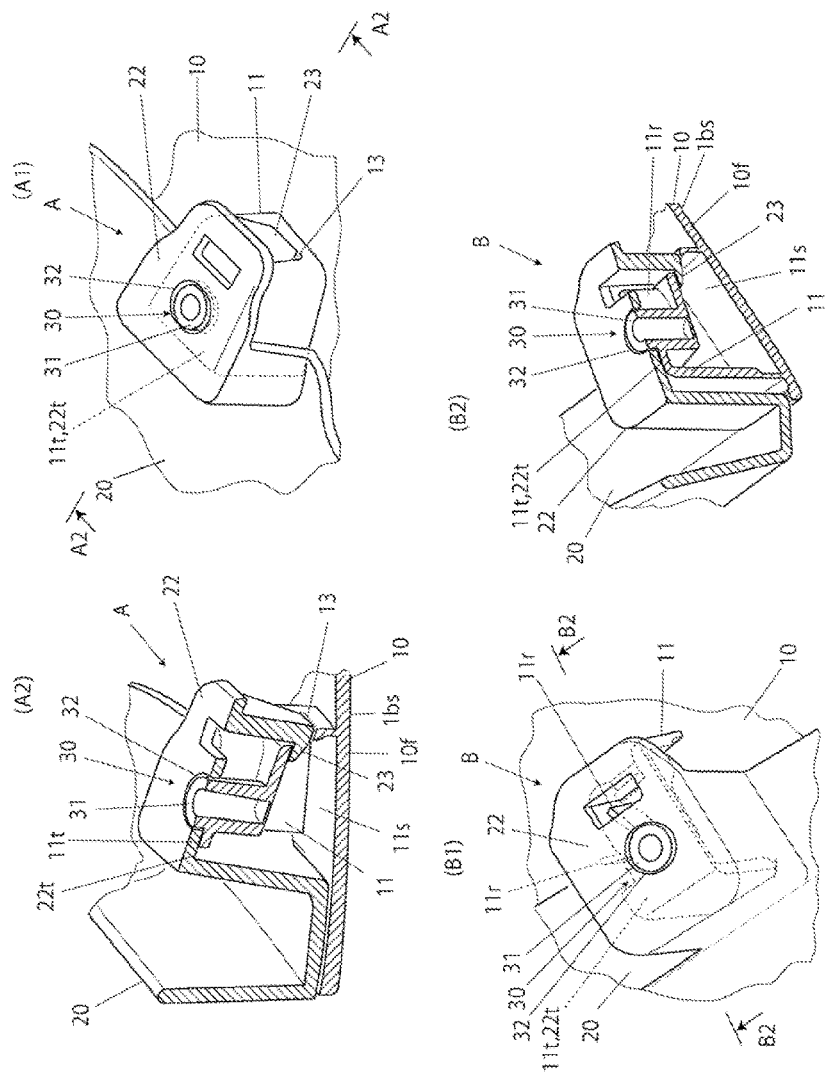
FIG. 3A1  FIG. 3A2  FIG. 3B1  FIG. 3B2

FIG. 5A1
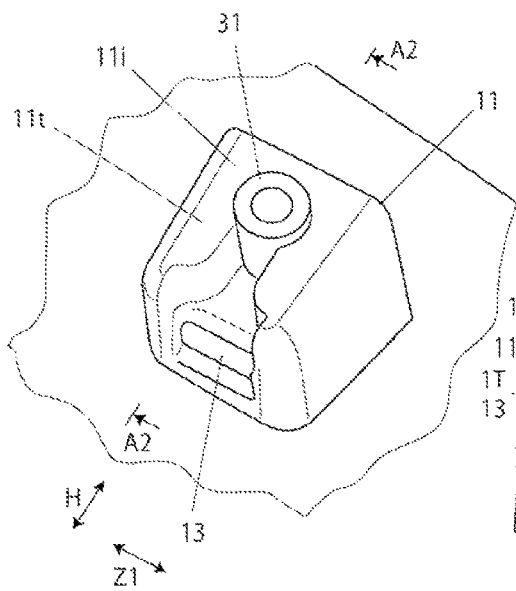
FIG. 5A2
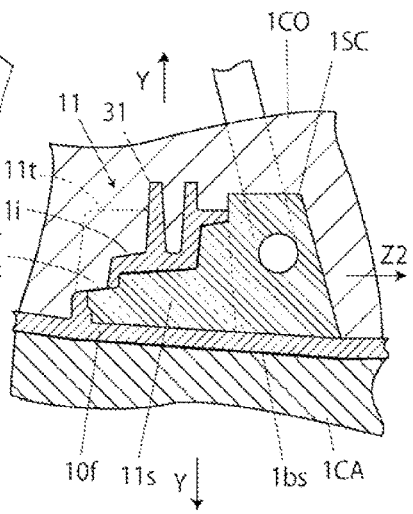
FIG. 5B1
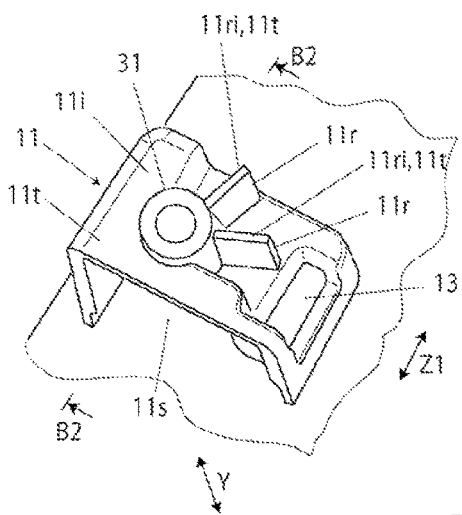
FIG. 5B2
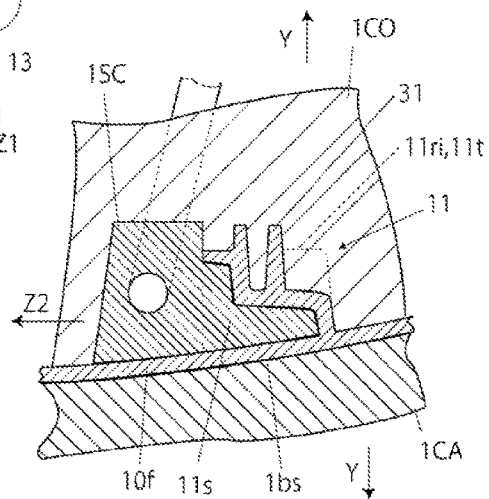

COUPLING STRUCTURE FOR RESIN PARTS, AND METHOD OF MANUFACTURING SAME

CROSS-REFERENCE TO RELATED APPLICATIONS

The present invention claims priority under 35 USC 119 based on Japanese patent application No. 2013-175281, filed on Aug. 27, 2013. The entire subject matter of this priority document, including specification claims and drawings thereof, is incorporated by reference herein.

BACKGROUND OF THE INVENTION

1. Field of the Invention

The present invention relates to a coupling structure for resin parts, and a method of manufacturing same. More particularly, the present invention pertains to such a coupling structure which may be used with or without tapping/tapping screws.

2. Background Art

As a coupling structure for resin parts, there has been known a structure based on tapping in which the resin parts are fastened together using tapping screws as described, for example, in Japanese Patent Laid-Open No. 2012-61925 (see, particularly, paragraph [0028] and FIG. 6 of the document).

Problem to be Solved by the Invention

A structure for coupling resin parts together by tapping not only causes a rise in cost but leads to an increase in the number of processing steps, because of the need for an operation of fastening by tapping screws.

SUMMARY OF THE INVENTION

An object of the present invention is to overcome the discussed problem by providing a resin parts coupling structure which achieves a reduction in cost and a reduction in the number of processing steps.

In order to achieve the above object, a resin parts coupling structure according to a first aspect of the present invention includes: a first member made of resin and including a flat surface portion which forms a surface of a vehicle body and a first projected portion projected from the flat surface portion toward an inside of the vehicle body; and a second member made of resin and having a second projected portion which is securely engaged with the first projected portion such that the first and second members are thereby coupled together. In the resin part coupling structure, the first projected portion includes a hollow space formed between an inwardly facing surface of the first projected portion and the flat surface portion, an engagement hole through which the hollow space and the inwardly facing surface communicate with each other, and a first receiving portion disposed more inwardly of the vehicle than the engagement hole. In addition, the second projected portion includes a second receiving portion which engages the first receiving portion, and a claw portion which extends more outwardly of the vehicle than the second receiving portion and is securely engaged with the engagement hole.

With such resin parts coupling structure according to the first aspect of the present invention, the first projected portion and the second projected portion are securely engaged with each other at the engagement hole and the claw portion. In addition, the engagement between the engagement hole and the claw portion is maintained by the contact between the first receiving portion and the second receiving portion. Therefore, the first member and the second member are coupled with each other favorably. This ensures that the first member and the second member can be coupled with each other favorably and securely, without need to use tapping screws. Accordingly, a reduction in cost and a reduction in the number of processing steps can be realized.

According to a second aspect of the present invention, in addition to the first aspect, the resin parts coupling structure may further include a positioning section including: a projection which is provided as part of either one of the first receiving portion and the second receiving portion; and a recess which is provided in the other of the first receiving portion and the second receiving portion and which mates with the projection. The projection and the recess are mated with each other, to thereby perform positioning of the first member and the second member, at the time of engaging the claw portion and the engagement hole with each other. This configuration according to the second aspect of the present invention ensures that when engaging the claw portion and the engagement hole, the positioning of the first member and the second member can be carried out by simply mating the projection and the recess with each other. Therefore, the operation of engaging the claw portion and the engagement hole with each other can be facilitated.

According to a third aspect of the present invention, in addition to the first or second aspects, the resin parts coupling structure includes: a plurality of the first projected portions and a plurality of the second projected portions provided in spaced relation to each other on the first and second members; and a plurality of the positioning sections provided with the first and second receiving portions of the first and second projected portions. This configuration according to the third aspect of the present invention ensures that when coupling the first member and the second member to each other, the first member and the second member can be easily adjusted into a predetermined positional relationship by the pluralities of the first projected portions, second projected portions and positioning sections.

According to a fourth aspect of the present invention, there is provided a method of manufacturing a resin parts coupling structure, comprising the steps of:

providing a first member made of resin and including a flat surface portion which forms a surface of a vehicle body and a first projected portion projected from the flat surface portion toward an inside of the vehicle body;

providing a second member made of resin and having a second projected portion which securely engages with the first projected portion such that the first and second members are thereby coupled together, wherein the first projected portion is molded to include a hollow space formed between an inwardly facing surface of the first projected portion and the flat surface portion, an engagement hole through which the hollow space and the inwardly facing surface communicate with each other, and a first receiving portion disposed more inwardly of the vehicle than the engagement hole, wherein the second projected portion is molded to include a second receiving portion which engages the first receiving portion, and a claw portion which extends more outwardly of the vehicle than the second receiving portion and securely engages with the engagement hole, and wherein the flat surface portion and the first projected portion are molded by moving a first core in one direction relative to a first cavity.

This configuration according to the fourth aspect of the present invention achieves the same advantages as the first aspect.

According to a fifth aspect of the present invention, in addition to any of the first-fourth aspects, the first receiving portion may be made of an end face of a rib or faces of ribs disposed inwardly of the vehicle and extending radially from the positioning section and in parallel to an extraction direction of the first core. This configuration according to the fifth aspect of the present invention permits the first receiving portion to be molded by the first core while securing the area of the first receiving portion.

According to a sixth aspect of the present invention, in addition to any of the first-fifth aspects, a configuration may be adopted wherein the projection of the positioning section is hollow with one closed end and an opposite open end, the recess of the positioning section is made of a through-hole formed in the other of the first and second receiving portions and is penetrated by the open end of the projection, and the first and second members are further coupled together by a tapping screw extended into the hollow projection and through the closed end thereof.

This configuration according to the sixth aspect of the present invention ensures that coupling of resin parts by tapping can also be readily effected via the coupling structure, in addition to the coupling by the claw portion and the engagement hole. Consequently, tapping can also be selected in the case where stronger coupling is needed, or the parts may simply be coupled together via secure engagement without the use of tapping screws when stronger coupling is not needed.

According to a seventh aspect of the present invention, in addition to any of the first-sixth aspects, the first projected portion is molded in such a manner that, simultaneously with molding the hollow space by a slide core, the slide core and the first core are brought into contact with each other to form the engagement hole in a slot shape, and a longitudinal direction of the engagement hole is orthogonal to a hitch direction in which the claw portion is securely engaged on the engagement hole.

This configuration according to the seventh aspect of the present invention permits the engagement hole to be formed simultaneously with the molding of the first projected portion. Therefore, any need for cutting or the like for forming the engagement hole is eliminated. In addition, the structure wherein the longitudinal direction of the engagement hole is orthogonal to the hitch direction in which the claw portion is hitched on the engagement hole ensures that even if the positional accuracy of the engagement hole is lowered, scattering of the margin for hitching of the claw portion on the engagement hole can be reduced.

For a more complete understanding of the present invention, the reader is referred to the following, non-limiting, detailed description section, which describes an exemplary embodiment of the present invention and should be read in conjunction with the accompanying drawings. Such exemplary embodiment is provided for illustration and better understanding of the present invention and is not intended to limit the invention. Throughout the following detailed description and in the drawings, like numbers refer to like parts.

BRIEF DESCRIPTION OF THE DRAWINGS

FIGS. 3A1-3B2 show figures illustrating the embodiment of portions of first and second members (resin parts) coupled together using the resin parts coupling structure according to the present invention, wherein FIG. 3A1 is a top perspective view, FIG. 3A2 is a sectional view taken along line A2-A2 in FIG. 3A1, FIG. 3B1 is a top perspective view at a different angle from FIG. 3A1, and FIG. 3B2 is a sectional view taken along line B2-B2 in the FIG. 3B1.

FIGS. 5A1-5B2 show figures illustrating molding of the embodiment of portions of the first member of the resin parts coupling structure according to the present invention, wherein FIG. 5A1 is an enlarged, top perspective view of the area A in FIG. 4, FIG. 5A2 is a sectional view corresponding to line A2-A2 in the figure FIG. 5A1, but where in the part is being molded using an example of a mold according to an embodiment of the present invention, FIG. 5B1 is an enlarged, top perspective view of area B in FIG. 4, and FIG. 5B2 is a sectional view corresponding to line B2-B2 in the figure FIG. 5B1 but where in the part is being molded.

DETAILED DESCRIPTION OF THE INVENTION

Figure 1:
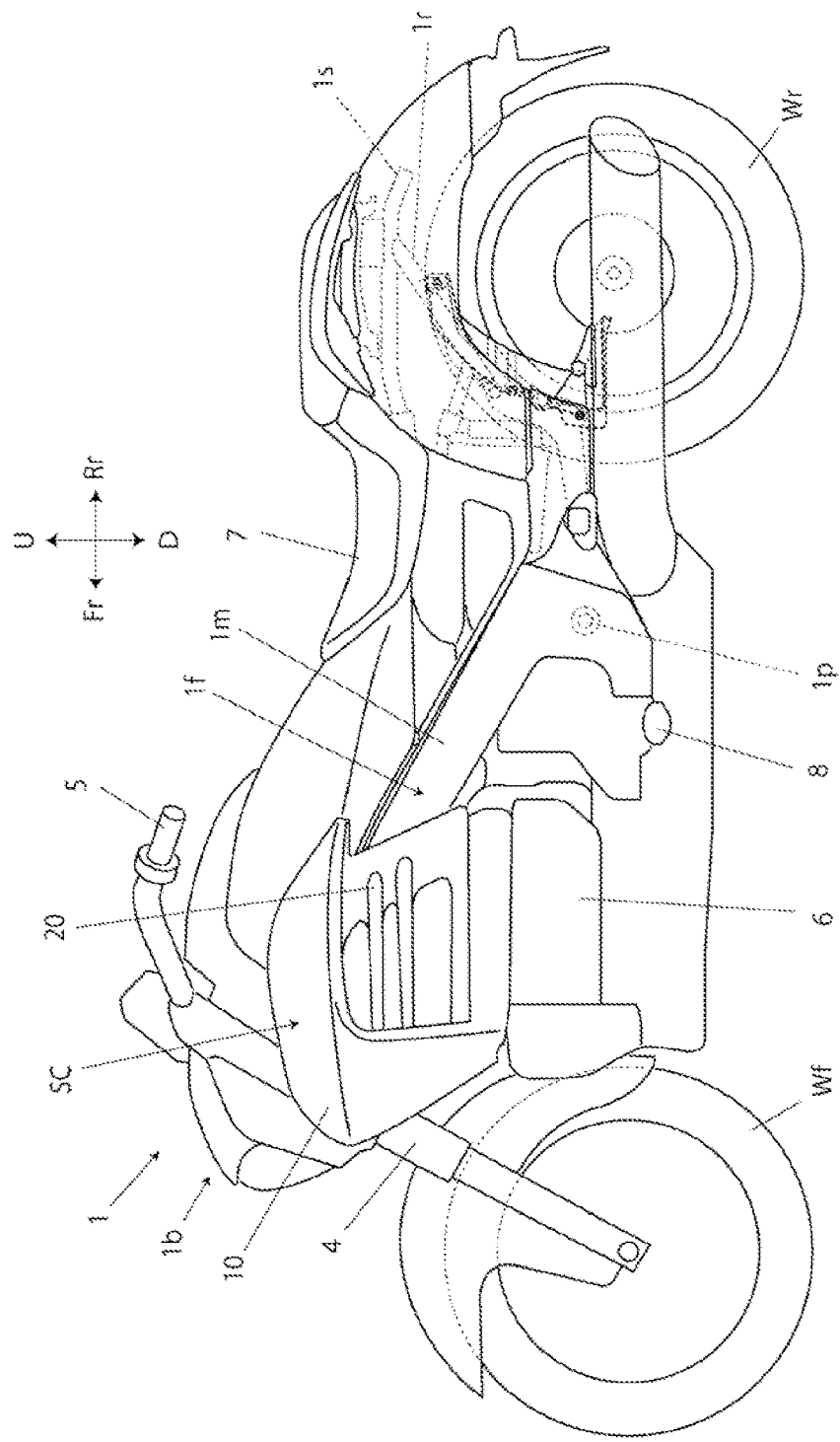
FIG. 1 is a side view of a motorcycle as one example of a vehicle to which an exemplary embodiment of the resin parts coupling structure according to the present invention is applicable.

Now, an exemplary embodiment of the resin parts coupling structure according to the present invention will be described below, referring to the drawings. The drawings are to be looked at according to the orientation of reference symbols. In the following description, the front and rear sides, the left and right sides, and the upper and lower sides will be those as viewed from the driver of a vehicle. If necessary, the front side of the vehicle will be indicated in the drawings as Fr, the rear side as Rr, the left side as L, the right side as R, the upper side as U, and the lower side as D. In the drawings, the same or corresponding parts are denoted by the same reference symbols.

The vehicle shown in FIG. 1 is a motorcycle to which the exemplary embodiment of the resin parts coupling structure according to the present invention is applicable. A body frame if of the vehicle includes a main frame $1m$, a seat rail is extended rearwardly of the main frame $1m$, and a rear frame $1r$ extended rearwardly of the main frame $1m$ to support the seat rail $1s$. A swing arm (not shown) is swingably supported on a rear portion of the main frame $1m$ through a pivot shaft $1p$. A rear wheel Wr is rotatably supported on the rear end of the swing arm. A front fork 4 is steerably mounted to a front portion of the main frame $1m$.

A front wheel Wf is rotatably mounted to the lower end of the front fork 4. A steering handlebar 5 is mounted to an upper portion of the front fork 4. A power unit (e.g., an engine) 6 is mounted downwardly of the main frame 1m. The rear wheel Wr is rotationally driven by the power unit 6. A driver can drive the motorcycle 1 by being seated on a driver's seat 7, putting his/her feet on driver's footrests 8 and gripping the steering handlebar 5.

The resin parts coupling structure according to the present invention is applicable to an arbitrary member formed of resin (fist member) having a flat surface portion forming a surface of a vehicle body of the motorcycle and another arbitrary member formed of resin (second member) coupled to this member (first member). In this embodiment, the resin parts coupling structure of the present invention is applied to a side cover SC forming a surface of a vehicle body 1b and covering a lateral side of a front portion of the main frame 1m. In the following, therefore, the side cover SC will be described specifically.

Figure 2:
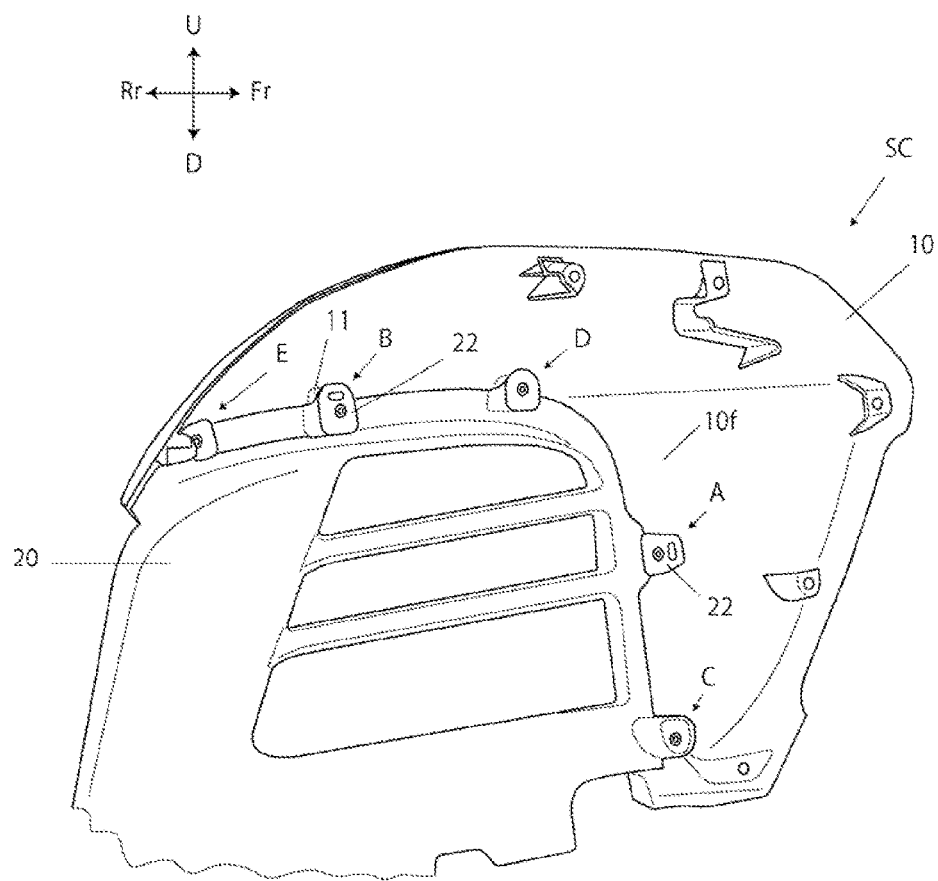
FIG. 2 is a view, from the inside of the vehicle, of a side cover representing an application example of the exemplary embodiment of the resin parts coupling structure according to the present invention.
Figure 4:
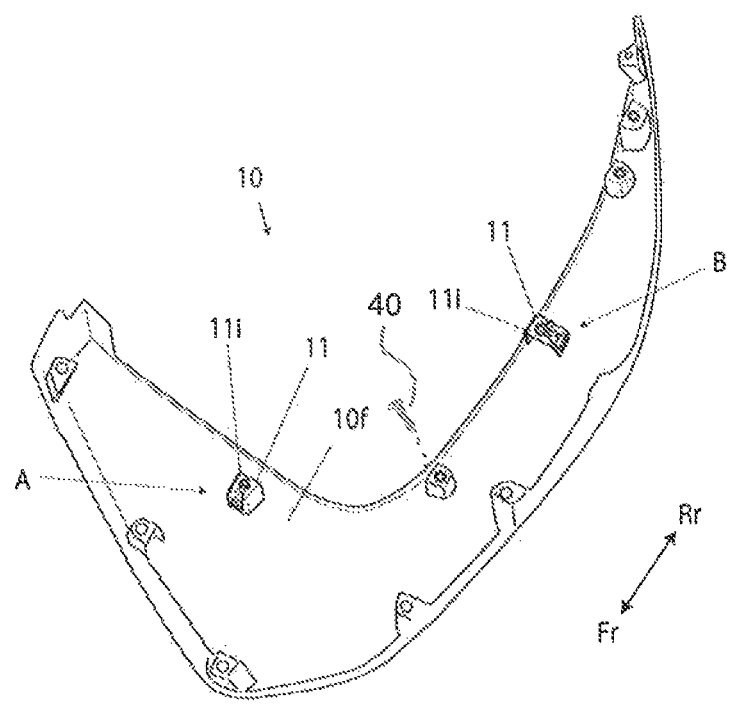
FIG. 4 is a perspective view, from a back or inner side, of the first member including portions of the resin parts coupling structure in the exemplary embodiment of the present invention.

As shown in FIGS. 1, 2 and 4, the side cover SC is configured by coupling a first member 10 and a second member 20 to each other. The first member 10 and the second member 20 are coupled to each other at, for example, five coupling areas A, B, C, D, and E. The resin part coupling structure according to the present invention is adopted for each of the coupling areas A and B of the five coupling areas A to E, while the other three coupling areas C, D, E adopt coupling structures which require use of a tapping screw, such as indicated at 40.

As shown in FIGS. 4 and 5A1-5B2, the first member 10 is made of resin, and includes a flat surface portion 10f forming a surface 1bs of the vehicle body 1b (FIG. 1), and a first projected portion 11 projected from the flat surface portion 10f toward the inside of the vehicle body 1b (the viewer's side of FIG. 2; the term "inside" or "inner side" herein means the inside or inner side with respect to the vehicle body). The flat surface portion 10f and the first projected portion 11 may be molded by moving a first core 1CO in one direction Y relative to a first cavity 1CA as shown in FIGS. 5A2 and 5B2.

As shown in FIGS. 2 and 3, the second member 20 is made of resin, and has a second projected portion 22 which is engaged with the first projected portion 11 of the first member 10. The second member 20 is coupled to the first member 10 by engaging the first projected portion 11 and the second projected portion 22 with each other.

As shown in FIGS. 4 and 5A1-5B2, the first projected portion 11 includes: a lightening or hollow space 11s formed between an inside surface 11i of the first projected portion 11 and the flat surface portion 10f; an engagement hole 13 through which the hollow space 11s and the inside surface 11i communicate with each other; and a first receiving portion 11t disposed on the inner side away from the engagement hole 13.

On the other hand, as shown in FIGS. 2 and 3A1-3B2, the second projected portion 22 includes: a second receiving portion 22t which is brought into contact with the first receiving portion 11t; and a claw portion 23 which extends to the outer side spaced from the second receiving portion 22t and is securely engaged with the engagement hole 13.

According to the resin parts coupling structure as above-mentioned, the first projected portion 11 and the second projected portion 22 are engaged with each other at the engagement hole 13 and the claw portion 23. In addition, the first receiving portion 11t and the second receiving portion 22t make contact with each other, whereby the engagement between the engagement hole 13 and the claw portion 23 is securely maintained. This permits the first member 10 and the second member 20 to be coupled with each other in a favorable manner. Therefore, the first member 10 and the second member 20 can be coupled to each other favorably, without need to use tapping screws or a tapping operation. Consequently, a reduction in cost and a reduction in the number of processing steps can be realized.

Figure 6:
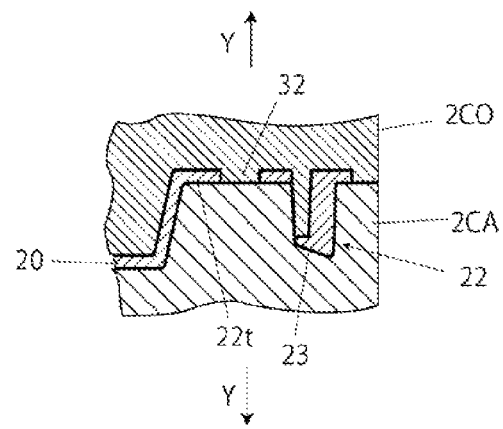
FIG. 6 is a sectional view showing a second projected portion and an example of a mold for molding the second projected portion according to an embodiment of the present invention.

As shown in FIG. 6, in forming the second member 20, the second projected portion 22 can be molded by moving a second core 2CO in one direction Y relative to a second cavity 2CA.

As shown in FIGS. 3A1-3B2, the resin parts coupling structure in this exemplary embodiment further includes a positioning section 30, which includes a projection 31 provided as part of either one of the first receiving portion 11t and the second receiving portion 22t, and a recess 32 which is provided in the other of the first receiving portion 11t and the second receiving portion 22t. The projection 31 and the recess 32 are mated with each other, to thereby perform positioning of the first member 10 and the second member 20, at the time of engaging the claw portion 23 and the engagement hole 13 with each other.

This configuration ensures that when engaging the claw portion 23 with the engagement hole 13, positioning of the first member 10 and the second member 20 can be performed by simply mating the projection 31 and the recess 32 to each other. Therefore, the operation of engaging the claw portion 23 with the engagement hole 13 can be facilitated. While the first receiving portion 11t is provided with the projection 31 and the second receiving portion 22t is provided with the recess 32 in the example shown in the drawings, the same effect can be obtained also by providing the first receiving portion 11t with the recess 32 and providing the second receiving portion 22t with the projection 31.

It is desirable that the resin parts coupling structure according to the present invention includes a plurality of the first projected portions 11, a plurality of the second projected portions 22, and a plurality of the positioning sections 30 provided with the first and second members (resin parts) to be coupled together. This configuration ensures that when coupling the first member 10 and the second member 20, the first member 10 and the second member 20 can be easily adjusted into a predetermined positional relationship by the pluralities of the first projected portions 11, the second projected portions 22 and the positioning sections 30. While the numbers of the first projected portions 11, the second projected portions 22 and the positioning sections 30 are two in the exemplary configuration shown in the drawings, the numbers of these components may be more than two.

As shown in FIGS. 5A2 and 5B2, in molding the first projected portion 11, the hollow space 11s is molded by a slide core 1SC, and, simultaneously, the slide core 1SC and the first core 1CO are brought into contact with each other to thereby form the engagement hole 13 in a slot shape by the contact part 1T (shown in only FIG. 5A2) according to an exemplary embodiment of the present invention. In this case, the longitudinal direction Z1 of the engagement hole 13 is orthogonal to the hitch direction H in which the claw portion 23 is hitched on the engagement hole 13.

This configuration favorably ensures that the engagement hole 13 can be formed by the molds (the slide core 1SC, the first core 1CO) simultaneously with the molding of the first projected portion 11. Therefore, the need for cutting or the like for forming the engagement hole 13 is eliminated. In addition, the configuration in which the longitudinal direction Z1 of the engagement hole 13 is orthogonal to the hitch direction H in which the claw portion 23 is hitched on the engagement hole 13 ensures that even if the positional accuracy of the engagement hole 13 is lowered, scattering of the margin for hitching of the claw portion 23 on the engagement hole 13 can be reduced. In other words, even if the relative positional accuracy of the engagement hole 13 and the claw portion 23 in the longitudinal direction Z1 of the engagement hole 13 is lowered, scattering of the margin for hitching of the claw portion 23 on the engagement hole 13 can be reduced, insofar as the claw portion 23 is within the longitudinal range of the engagement hole 13.

As shown in FIGS. 3B1 and 5B1, the first member 10 in the coupling area B has the first receiving portion 11*t* composed of inside end faces 11*ri* of ribs 11*r* which extend radially from the positioning section 30 (in this case, the projection 31) and in parallel to the extraction direction Y of the first core 1CO. This configuration ensures that the first receiving portion 11*t* can be molded by the first core 1CO while securing the area of the first receiving portion 11*t*.

In the first projected portion 11 shown in FIG. 5B1, two ribs 11*r* are provided in a region ranging in clock position (relative direction) of roughly from 12 o'clock to 3 o'clock, as viewed clockwise toward the engagement hole 13 side with the projection 31 as a center and with a straight line parallel to the longitudinal direction Z1 of the engagement hole 13 as a reference (12 o'clock) in this embodiment. The first receiving portion 11*t* is composed of the inside end faces 11*ri* of the ribs 11*r* and the inside surface 11*i* of the first projected portion 11. However, the number of the ribs 11*r* and the region in which they are provided can be set as required. Thus, the ribs 11*r* may be provided throughout the periphery of the projection 31, and the first receiving portion 11*t* may be composed only of the inside end faces 11*ri* of the ribs 11*r*.

Figure 7A:
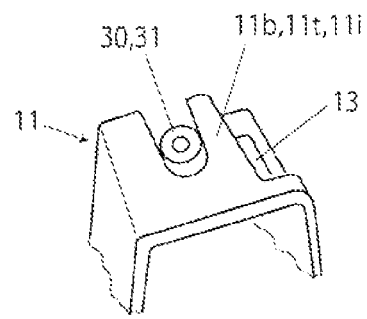
FIGS. 7A to 7D illustrate an effect of ribs provided with the first member according to the exemplary embodiment of the present invention.

The first projected portion 11 shown in FIG. 5B1 is so configured that the longitudinal direction Z1 of the engagement hole 13 coincides with the sliding direction Z2 (see FIG. 5B2) of the slide core 1SC. In the first projected portion 11 configured in this way, as shown for example in FIG. 7A, the first receiving portion 11*t* can be composed of the inside surface 11*i* of the first projected portion 11, even at a part 11*b* between the positioning section 30 (the projection 31) and the engagement hole 13.

Figure 7B:
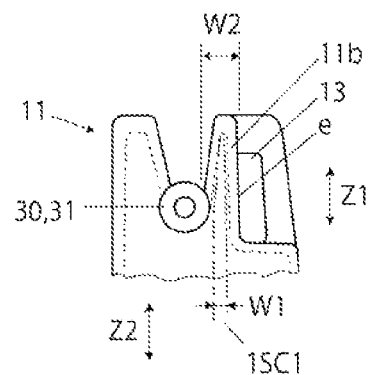
Figure 7C:
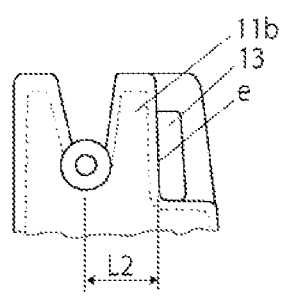

The coupling function (coupling accuracy and coupling strength) between the first projected portion 11 and the second projected portion 22 is higher as the distance between the positioning section 30 (the projection 31) and an engaging section (e) of the engagement hole 13 and the claw portion 23 is shorter. Therefore, it is desirable to set small the width W2 of the above-mentioned part 11*b*. Such a configuration, however, would produce a problem that as shown in FIG. 7B, the width W1 of a portion 1SC1 of the slide core 1SC for molding the above-mentioned part 11*b* becomes excessively narrow, leading to a lowering in extractability of the mold. On the other hand, an increase in the width W1 of the portion 1SC1 of the slide core 1SC could enlarge the distance L (L2) between the positioning section 30 (the projection 31) and the engaging section (e) of the engagement hole 13 and the claw portion 23, as shown in FIG. 7C.

Figure 7D:
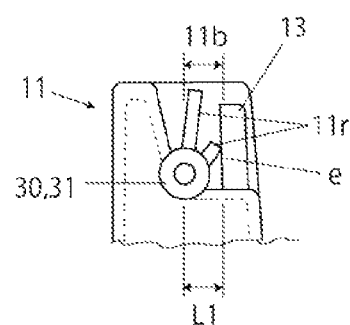

To avoid these situations, a configuration may be adopted according to an embodiment of the present invention wherein, as shown in FIG. 7D, at least part of the above-mentioned part 11*b* is composed of ribs 11*r*, and the first receiving portion 11*t* is composed of the inside end faces 11*ri* of the ribs 11*r*. According to this configuration, the slide core 1SC can be prevented from becoming too small in width, and the distance (L1) between the positioning section 30 (the projection 31) and the engaging section (e) of the engagement hole 13 and the claw portion 23 can be reduced. Therefore, it is desirable to provide the ribs 11*r* between the positioning section 30 (the projection 31) and the engagement hole 13.

In FIG. 2, in this embodiment, the resin part coupling structure according to the present invention is adopted for the coupling areas A and B. For the other coupling areas C, D and E, coupling by tapping is adopted. Specifically, a series of coupling areas (in the illustrated example, the coupling areas A, B, C, D and E) for coupling the first member 10 and the second member 20 to each other include the coupling areas according to the present invention and the coupling areas based on tapping, and the two kinds of coupling areas are alternately arranged. In addition, of the series of coupling areas, both end ones (in the illustrated example, the coupling areas C and E) involve coupling by tapping. This configuration makes it possible to promise a reduction in cost and a reduction in the number of processing steps, and, simultaneously, to secure a sufficient coupling strength.

The positioning section 30 may include a hollow annular projection 31 which is formed as part of the first receiving portion 11*t*, and a recess 32 which is composed of a through-hole formed in the second receiving portion 22*t* and penetrated by an end the projection 31. This ensures that fastening of the resin parts by tapping can also be easily carried out in a state where the projection 31 is fitted in the recess 32, e.g., a tapping screw (not shown) may be inserted in an open end of the projection 31, and driven so that a pointed end of the screw penetrates through the closed end of the projection and a head of the tapping screw securely engages the inner surface of the second receiving portions 22*t*. As shown in FIGS. 5A2 and 5B2 the hollow recess in the projection 31 may be tapered to be narrower from the open end thereof to the closed end thereof. According to this configuration, coupling by tapping can be selected, in addition to the coupling by engagement between the claw portion 23 and the engagement hole 13. This makes it possible to select tapping in the case where stronger coupling is needed.

Although the invention has been explained in conjunction with the present exemplary embodiment heretofore, the technical scope of the invention is not limited to the scope described in the above-mentioned embodiment. It is apparent to those who are skilled in the art that various modifications and improvements may be added to the above-mentioned embodiment. It is also apparent from the description and the claims appended hereto that embodiments to which such modifications and improvements are added also fall within the technical scope of the invention.

DESCRIPTION OF REFERENCE SYMBOLS

1CA: First cavity, 1CO: First core, 1SC: Slide core, 1T: Contact part, 1*b*: Vehicle body, 1*bs*: Surface, 10: First member, 10*f*: Flat surface portion, 11: First projected portion, 11*i*: Inside surface, 11*t*: First receiving portion, 11*s*: Lightening space, 11*r*: Rib, 11*i*: Inside end face, 13: Engagement hole, 20: Second member, 22: Second projected portion, 22*t*: Second receiving portion, 23: Claw portion, 30: Positioning section, 31: Projection, 32: Recess

The invention claimed is:

1. A resin parts coupling structure comprising:
a first member made of resin, including a flat surface portion which forms a surface of a vehicle body, and a first projected portion projected from the flat surface portion toward an inside of the vehicle body; and a second member made of resin, including a second projected portion which is securely engaged with the first projected portion such that the first and second members are thereby coupled together;

wherein the first projected portion includes a hollow space formed between an inside surface of the first projected portion and the flat surface portion, an engagement hole, through which the hollow space and the inside surface communicate with each other, and a first receiving portion disposed more inwardly of the vehicle body than the engagement hole;

wherein the second projected portion includes a second receiving portion which is brought into engagement with the first receiving portion, and a claw portion which extends more outwardly of the vehicle body than the second receiving portion and is within the longitudinal range of the engagement hole, and is securely engaged with the engagement hole;

and further including a positioning section which includes a cylindrical projection provided as part of either one of the first receiving portion, and the second receiving portion, and a recess which is provided in the other of the first receiving portion and the second receiving portion, and further including ribs extending radially from the cylindrical projection of the positioning section; and the projection and the recess are mated with each other to thereby perform positioning of the first member and the second member, and the engagement hole is located radially outward of the ribs such that at least one of the ribs extends between the projection and the engagement hole at the time of engaging the claw portion and the engagement hole with each other.

2. The resin parts coupling structure according to claim 1, further comprising: a plurality of the first projected portions and a plurality of the second projected portions provided in spaced relation to each other on the first and second members; and a plurality of the positioning sections provided with the first and second receiving portions of the first and second projected portions.

3. The resin parts coupling structure according to claim 2, wherein the first receiving portion is formed of an inside end face of a rib extending radially from the projection of the positioning section.

4. The resin parts coupling structure according to claim 3, wherein the projection of the positioning section is hollow with one closed end and an opposite open end, the recess of the positioning section is made of a through-hole formed in the other of the first and second receiving portions and is penetrated by the open end of the projection.

5. The resin parts coupling structure according to claim 1, wherein the first receiving portion is formed of an inside end face of a rib extending radially from the projection of the positioning section.

6. The resin parts coupling structure according to claim 5, wherein the projection of the positioning section is hollow with one closed end and an opposite open end, the recess of the positioning section is made of a through-hole formed in the other of the first and second receiving portions and is penetrated by the open end of the projection.

7. The resin parts coupling structure according to claim 1, wherein the projection of the positioning section is hollow with one closed end and an opposite open end for receiving a coupling member, the recess of the positioning section is made of a through-hole formed in the other of the first and second receiving portions and is penetrated by the open end of the projection.

8. A method of manufacturing a resin parts coupling structure according to claim 1, comprising the steps of:

providing a first member made of resin and including a flat surface portion which forms a surface of a vehicle body and a first projected portion projected from the flat surface portion toward an inside of the vehicle body; and providing a second member made of resin and having a second projected portion which securely engages with the first projected portion such that the first and second members are thereby coupled together, wherein the first projected portion is molded to include a hollow space formed between an inwardly facing surface of the first projected portion and the flat surface portion, an engagement hole through which the hollow space and the inwardly facing surface communicate with each other, and a first receiving portion disposed more inwardly of the vehicle than the engagement hole, wherein the second projected portion is molded to include a second receiving portion which engages the first receiving portion, and a claw portion which extends more outwardly of the vehicle body than the second receiving portion and is within the longitudinal range of the engagement hole, and securely engages with the engagement hole, wherein the flat surface portion and the first projected portion are molded by moving a first core in one direction relative to a first cavity, wherein the first and second projected portions are molded to further include a positioning section, including: a cylindrical projection which is provided as part of either one of the first receiving portion and the second receiving portion, and a recess which is provided in the other of the first receiving portion and the second receiving portion and which mates with the projection when the claw portion and the engagement hole are engaged with each other and further including ribs extending radially from the cylindrical projection of the positioning section; wherein the projection and the recess are mated with each other to thereby perform positioning of the first member and the second member, and the engagement hole is located radially outward of the ribs such that at least one of the ribs extends between the projection and engagement hole at the time of engaging the claw portion and the engagement hole with each other.

9. The method according to claim 8, wherein the first and second members are formed to include: a plurality of the first projected portions and a plurality of the second projected portions provided in spaced relation to each other on the first and second members; and a plurality of the positioning sections provided with the first and second receiving portions of the first and second projected portions.

10. The method according to claim 9, wherein the first receiving portion is formed of an inside end face of a rib extending radially from the projection of the positioning section and in parallel to a core extraction direction of the first core when molding the first projected portion.

11. The method according to claim 9, wherein the projection of the positioning section is formed hollow with one closed end and an opposite open end for receiving a coupling member, the recess of the positioning section is made of a through-hole formed in the other of the first and second receiving portions and is penetrated by the open end of the projection.

12. The method according to claim 9, wherein the wherein the first projected portion is molded such that, simultaneously with molding the hollow space by a slide core, the slide core and the first core are brought into contact with each other to form the engagement hole in a slot shape, and a longitudinal direction of the engagement hole is orthogonal to a hitch direction in which the claw portion is securely engaged to the engagement hole.

13. The method according to claim 8, wherein the first receiving portion is formed of an inside end face of a rib extending radially from the projection of the positioning section and in parallel to an extraction direction of the first core when molding the first projected portion.

14. The method according to claim 13, wherein the projection of the positioning section is formed hollow with one closed end and an opposite open end for receiving a coupling member, the recess of the positioning section is made of a through-hole formed in the other of the first and second receiving portions and is penetrated by the open end of the projection.

15. The method according to claim 8, wherein the projection of the positioning section is formed hollow with one closed end and an opposite open end for receiving a coupling member, the recess of the positioning section is made of a through-hole formed in the other of the first and second receiving portions and is penetrated by the open end of the projection.

16. The method according to claim 8, wherein the wherein the first projected portion is molded such that, simultaneously with molding the hollow space by a slide core, the slide core and the first core are brought into contact with each other to form the engagement hole in a slot shape, and a longitudinal direction of the engagement hole is orthogonal to a hitch direction in which the claw portion is securely engaged to the engagement hole.

17. A resin parts coupling structure comprising:
a first member made of resin, including a flat surface portion which forms a surface of a vehicle body, and a first projected portion projected from the flat surface portion toward an inside of the vehicle body; and
a second member made of resin, including a second projected portion which is securely engaged with the first projected portion such that the first and second members are thereby coupled together without tapping screws;
wherein the first projected portion includes a hollow space formed between an inside surface of the first projected portion and the flat surface portion, an engagement hole, through which the hollow space and the inside surface communicate with each other, and a first receiving portion disposed more inwardly of the vehicle body than the engagement hole;
wherein the second projected portion includes a second receiving portion which is brought into engagement with the first receiving portion, and a claw portion which extends more outwardly of the vehicle body than the second receiving portion and is within the longitudinal range of the engagement hole, and is securely engaged with the engagement hole; and
further including a positioning section which includes a cylindrical projection provided as part of the first receiving portion, and a recess which is provided in the second receiving portion, and including ribs extending radially from the cylindrical projection; and
wherein inside end faces of the ribs extending radially from the cylindrical projection of the positioning section, and the cylindrical projection and the recess are mated with each other to thereby position the first member and the second member, and the engagement hole is located radially outward of the ribs such that at least one of the ribs extends between the projection and engagement hole at the time of engaging the claw portion and the engagement hole with each other.

\* \* \* \* \*